(12) United States Patent
Koopmans et al.

(10) Patent No.: US 7,763,173 B1
(45) Date of Patent: Jul. 27, 2010

(54) METHOD FOR REMEDIATING SOLIDS IN WASTE LIFTING STATIONS

(76) Inventors: Richard J. Koopmans, 15035 SE. 46th St., Bellevue, WA (US) 98006-2568; Kristinn G. Drewry, 15035 SE. 46th St., Bellevue, WA (US) 98006-2568

( * ) Notice: Subject to any disclaimer, the term of this patent is extended or adjusted under 35 U.S.C. 154(b) by 0 days.

(21) Appl. No.: 12/319,790

(22) Filed: Jan. 12, 2009

(51) Int. Cl.
C02F 3/00 (2006.01)
(52) U.S. Cl. .................................................. 210/620
(58) Field of Classification Search .......... 210/620–629
See application file for complete search history.

(56) References Cited

U.S. PATENT DOCUMENTS

| | | | |
|---|---|---|---|
| 4,136,970 A * | 1/1979 | Cabrera et al. ............... 366/101 |
| 4,595,296 A | 6/1986 | Parks |
| 6,280,636 B1 | 8/2001 | Locklair |
| 6,372,140 B2 | 4/2002 | Kelly |
| 6,629,773 B2 | 10/2003 | Parks |
| 7,282,141 B2 | 10/2007 | Koopmans |
| 7,374,675 B2 | 5/2008 | Koopmans |
| 7,527,736 B2 * | 5/2009 | Shafer et al. ................. 210/620 |
| 2006/0110491 A1 | 5/2006 | Parks |
| 2006/0254977 A1 | 11/2006 | Koopmans |

* cited by examiner

*Primary Examiner*—Chester T Barry
(74) *Attorney, Agent, or Firm*—Anthony Claiborne (57) ABSTRACT

A process removes or eliminates altogether accumulations of solid and semi-solid, water immiscible materials adhering to walls, and equipment, particularly near the high liquid mark, in tanks of waste liquid lift stations. Compressed gas is used to generate large bubble masses of six inches to several feet in diameter within the waste liquid. As these large bubble masses rise through the liquid in the tank, convection currents generated by the rising bubbles agitate and loosen pieces of accumulations adhering to the tank and lift station equipment, resulting to in a slurry of waste liquid and immiscible materials which can then be pumped from the tank by lift station equipment for further processing. In some embodiments, continuous or frequent periodic generation of the large bubble masses prevents the accumulation of such materials altogether. In some embodiments, wastewater aeration is also provided, which, in combination with biological augmentation, further enhances the effectiveness of accumulated material removal.

6 Claims, 6 Drawing Sheets

METHOD FOR REMEDIATING SOLIDS IN WASTE LIFTING STATIONS

BACKGROUND

1. Field of the Invention

This invention relates to methods for mixing liquid waste in lifting stations. More specifically, this invention relates to methods for breaking up grease and other solid and semi-solid accumulations in liquid waste lifting stations.

2. Description of the Related Art

Wastewater systems typically use gravity to transport liquid waste from homes and businesses to provide wastewater treatment at a central facility. For cities that have many changes in elevation, lift stations are used to pump liquid waste, such as storm water and sewage, from low-lying areas to areas of higher elevation for further transport and treatment.

A wastewater lift station typically comprises a concrete well that is fitted with several pumps, often of submersible design. Lift station design further includes level-sensing probes, valves and pressure sensors, and may also include a stand-by generator. In operation, the lift station serves as a temporary holding tank for liquid waste, the waste being periodically pumped from the lift station to higher elevations. Liquid waste is transported by the upstream wastewater system to flow into the lift station well. When the amount of liquid waste in the well reaches a pre-determined high level, the lift station's pumps are engaged to pump liquid waste from the lift station to the downstream wastewater system. The pumping progresses and liquid waste is emptied from the lift station until the amount of liquid waste in the well falls to a pre-determined low level, at which point the lift station pumps are disengaged.

Semi-solid, water immiscible materials, such as cooking oil, lubricants and grease, as well as light plastics, are common components of the liquid waste slurry entering wastewater lift stations. As wastewater is held in a lift station, these materials, along with scum from calcium and magnesium soaps tend to coagulate and adhere to lift station walls and equipment. Because many of these materials are less dense than water, they tend to float on the surface of the waste liquid, accumulating particularly with pronounced thickness on walls and equipment near the high liquid level in the lift station. As is known by those in the art, the level-sensing probes used in most lift stations are simply floats, detecting liquid level by floating on the surface of the wastewater. Accumulations of insoluble material within the lift station can restrain the floats below the surface of the waste water, leading to improper operation of the lift station and, in extreme cases, lift station overflow when the float is unable to detect that the liquid waste in the well has reached and exceeded its pre-determined operational high level. Furthermore, over time, the amount of such accumulated insoluble material can actually reduce the holding capacity of the lift station and, because large pieces of such material can break off and become lodged in lift station equipment such as valves and pumps, the presence of such large accumulations may adversely affect lift station operation and damage lift station equipment.

A number of approaches have heretofore been used to break up and reduce or eliminate the accumulated deposits of immiscible material in lift stations. One approach for dealing with such accumulated deposits is by direct mechanical removal, emptying the tank of waste liquid followed by manual cleaning of accumulations by appropriately garbed personnel. Drawbacks in such approaches include the fact that the station must remain inoperative during the time it is emptied and cleaned. Other drawbacks simply follow from aesthetic and hygienic challenges of placing personnel inside wells that have held raw sewage.

Another approach to remediate semi-solid accumulations in lift stations has been to use pumps of various designs to generate strong currents in the liquid waste within the lift station, in order to effect the mechanical break-up of accumulated deposits. This approach has the drawback that pumps providing sufficiently strong currents for such purposes consume considerable energy. Furthermore, the pumps, being electromechanical devices, are inevitably subject to significant maintenance and repair costs.

Another approach gaining wide acceptance for removing or reducing accumulations of immiscible material in lift stations is biological augmentation, whereby specialized aerobic, grease-metabolizing bacteria are introduced into the tank wastewater. When properly applied, these organisms can break down large lift station grease deposits into smaller pieces which can then be pumped in a slurry with other liquid waste into the downstream wastewater system by lift station equipment. Because the microorganisms used for biological augmentation are aerobic, the availability of oxygen in the wastewater can be a limiting factor on the effectiveness of the process. For this reason, effective biological remediation often requires the addition of aerating diffusers to the lift station tank along with necessary supply lines and source of pressurized gas to supply needed oxygen.

Biological remediation is subject to several additional limitations. Use of too high a concentration of bacteria in the lift station wastewater, while leading to fairly rapid grease deposit break-up, can result in large quantities of small pieces of undigested grease transferred to the downstream wastewater system, leading to downstream clogging and excessive foaming at the wastewater treatment plant. While use of lower concentrations of bacteria may actually result in more complete digestion of accumulated grease with fewer downstream problems, effective remediation by lower bacterial concentrations takes much longer, potentially leaving the lift station partially or fully inoperative for a longer period of time. Further, even when such biological augmentation is optimized, light plastic immiscibles deposited in the lift station, such as condoms, plastic wrap and the like remain unaffected.

BRIEF SUMMARY OF THE INVENTION

The present invention provides a means for removing or eliminating altogether accumulations of semi-solid, water immiscible materials adhering to walls, and equipment, particularly near the high liquid mark, in tanks of waste liquid lift stations. Compressed gas is used to generate large bubble masses of six inches to several feet in diameter within the waste liquid toward the bottom of the lift station tank. As these bubble masses rise through the liquid in the tank, convection currents generated by the rising bubbles agitate and loosen pieces of accumulations adhering to the tank and lift station equipment, resulting in a slurry of waste liquid and immiscible materials which can then be pumped from the tank by lift station equipment for further processing. In some embodiments of the invention, continuous or frequent periodic generation of the large bubble masses prevents the accumulation of such materials altogether. In some embodiments of the invention, wastewater aeration is also provided, which, in combination with biological augmentation, further enhances the effectiveness of accumulated solid removal.

BRIEF DESCRIPTION OF THE DRAWINGS

The foregoing objects, as well as further objects, advantages, features and characteristics of the present invention, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE PREFERRED EMBODIMENTS

Figure 1:
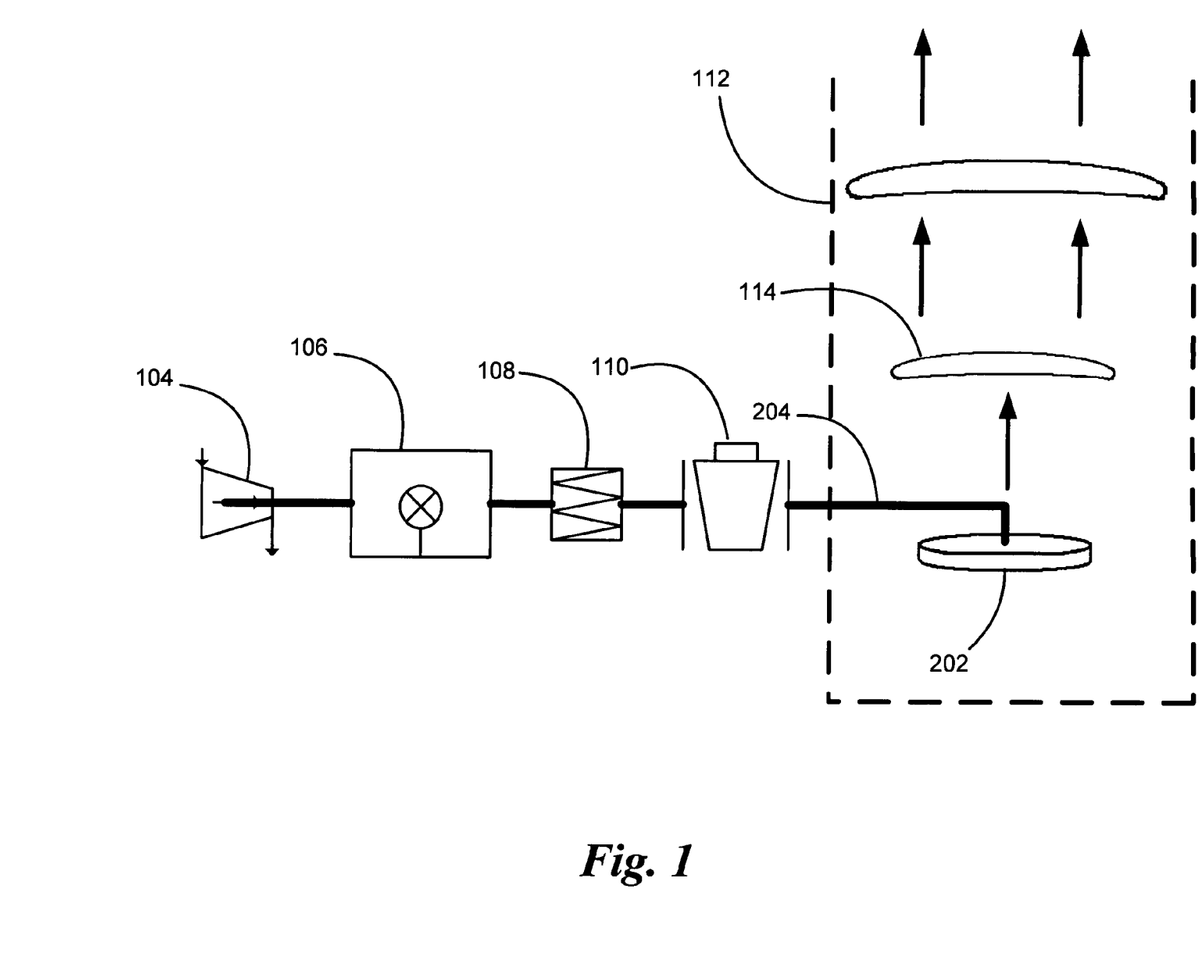
FIG. 1 is a diagrammatic depiction of an embodiment of the present invention providing large mixing bubbles to a lift station.

FIG. 1 is a diagrammatic representation of an embodiment of the present invention for generating large mixing bubbles 114 within a lift station 112. Compressor 104 provides compressed air or other gas to regulator 106, which in turn provides pressure-regulated compressed gas through filter 108 to pulse-valve 110. When pulse valve 110 is opened, a pulse of filtered compressed gas flows through mixing bubble supply line 204 to forming plate 202 where gas accumulates to be released as large bubbles 114 that float upward through lift station 112, as described in further detail in reference to FIG. 2 below.

Compressor 104 can be any source of compressed air or gas. Embodiments of the present invention have been operated effectively with a variety of sources providing compressed gas at 100-125 pounds per square inch (psi) through one-inch tubing.

In some embodiments, regulator 106 and filter 108 are combined in a single unit, such as the B20 and B21 QIX filter/regulators supplied by Parker-Hannifin Corp., Pneumatic Division of Richland, Mich. In other embodiments, the filter and the regulator serving the filter are separate components. In any case, the principal purpose of the filter/regulator is the removal of condensed water and other contaminants in the compressed gas received from compressor 104, as well as to regulate gas pressure. In some embodiments, the filtered and regulated pressurized air is supplied to pulse valve 110 (described below) at a pressure of 40 to 60 psi.

Pulse valve 110 can be any form of solenoid-controlled gas valve capable of providing pulses of compressed gas, such as the control valve with 120 VAC solenoid, part number 6611A-311-PM-111 DA, from MAC Valves, Inc. of Wixom, Mich. As will be understood by those in the art, embodiments also provide control circuitry for operation of valve 110 (not depicted in FIG. 1).

As will be understood by those in the art, regulator 106, filter 108 and pulse valve 110 may all be incorporated in a single enclosure for ease of installation, access and maintenance in the lift station environment.

Figure 2:
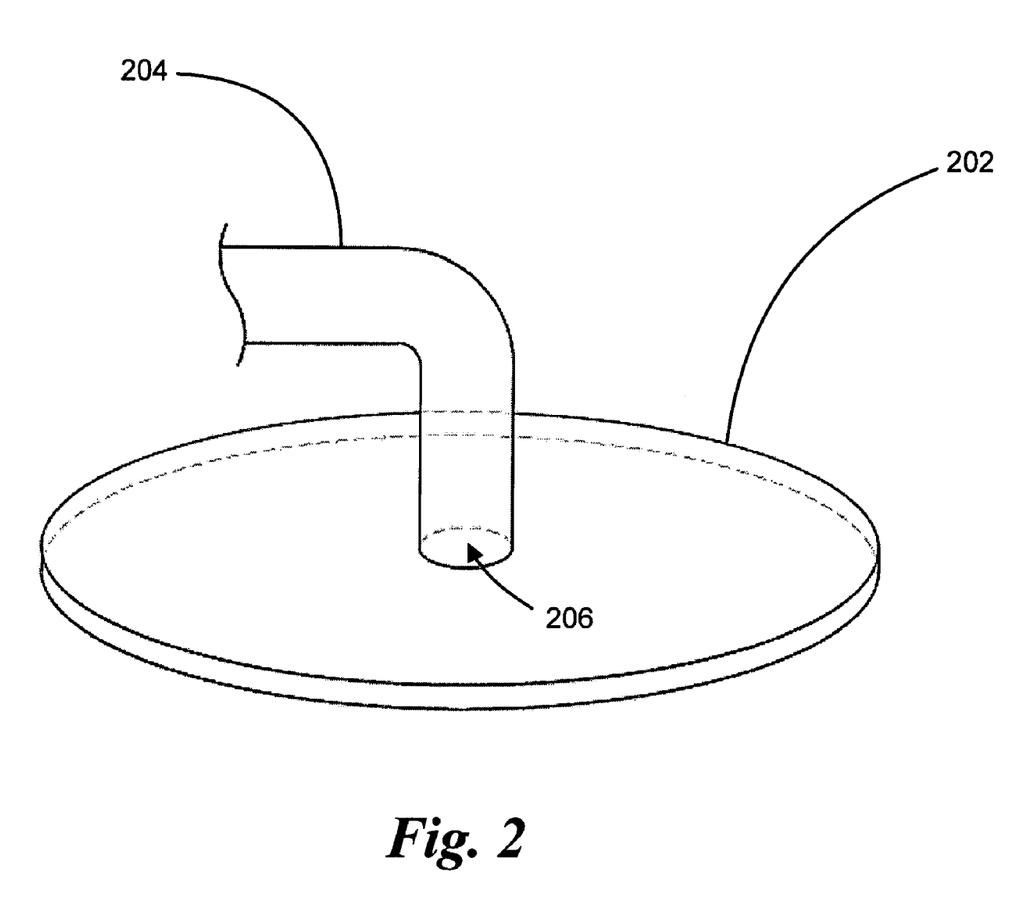
FIG. 2 depicts one embodiment of a plate for forming large mixing bubbles according to an embodiment of the invention.

FIG. 2 depicts an exemplary forming plate 202 for producing the large mixing bubbles generated by the present invention. Compressed air or other gas under pressure is provided as a pulse from mixing bubble supply line 204 to exit orifice 206 under forming plate 202. The gas from orifice 206 accumulates under forming plate 202, which prevents the gas from rising toward the surface of the wastewater until more gas has accumulated than forming plate 202 can hold, at which time most of the air escapes from under forming plate 202 around its edges, forming a large mixing bubble such as 114 depicted in FIG. 1. As the large mixing bubbles generated by the present invention rise through the waste liquid, mixing currents are generated in the liquid that mechanically loosen immiscible deposits adhering to the lift station and its equipment.

Figure 3A:
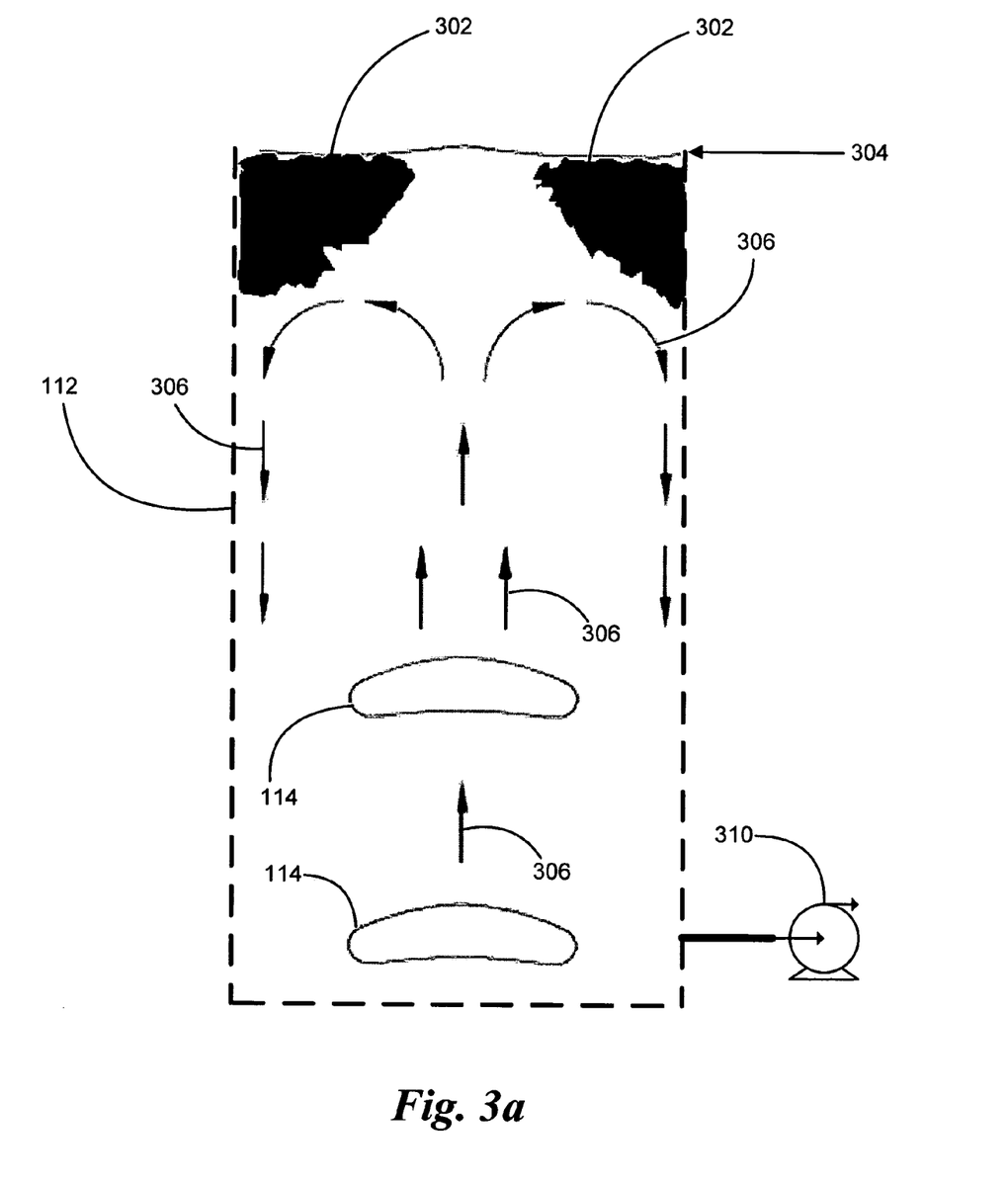
FIGS. 3a-3c illustrate progressive remediation of accumulated immiscible materials by operation of the present invention over time.
Figure 3B:
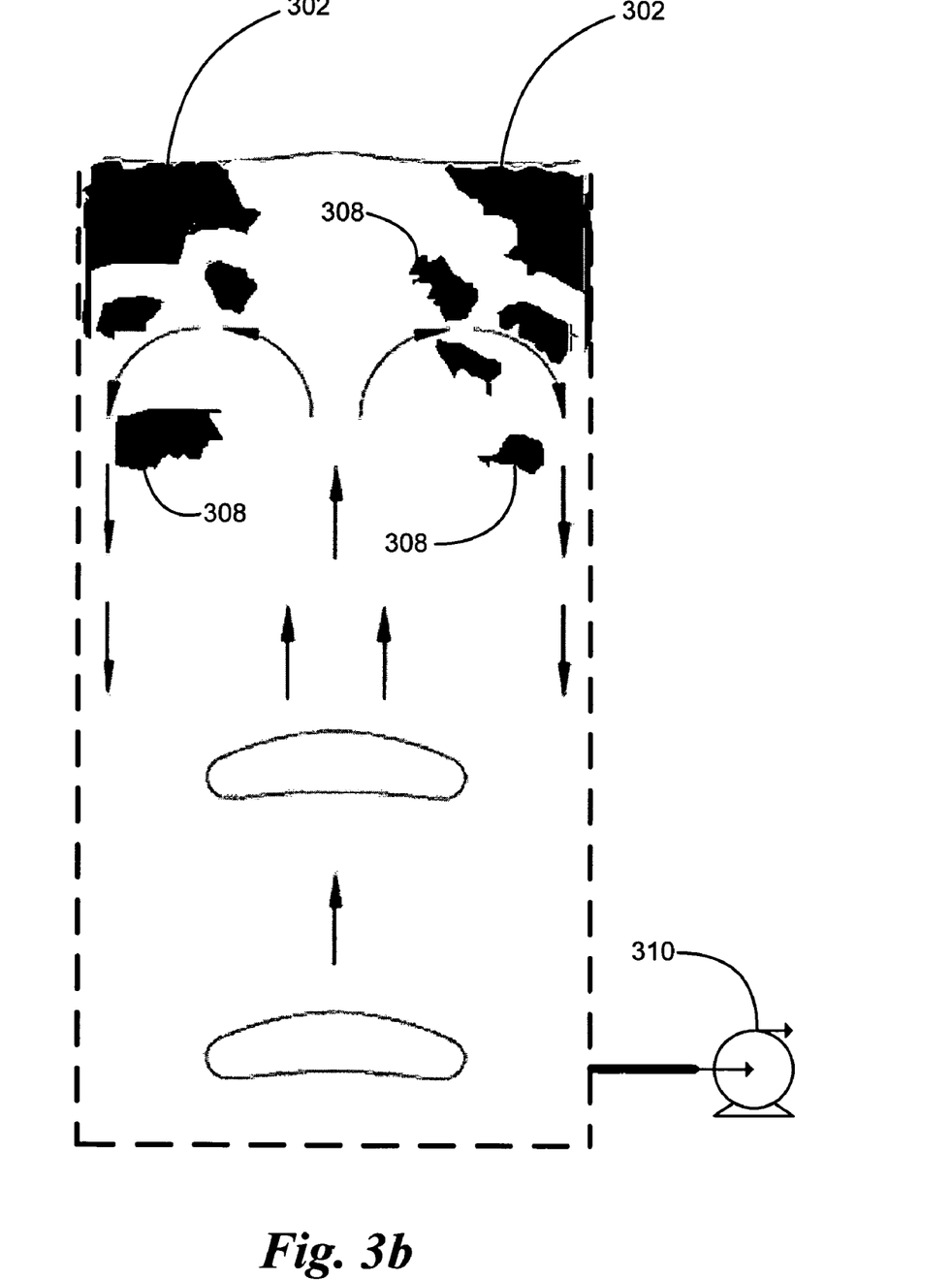
Figure 3C:
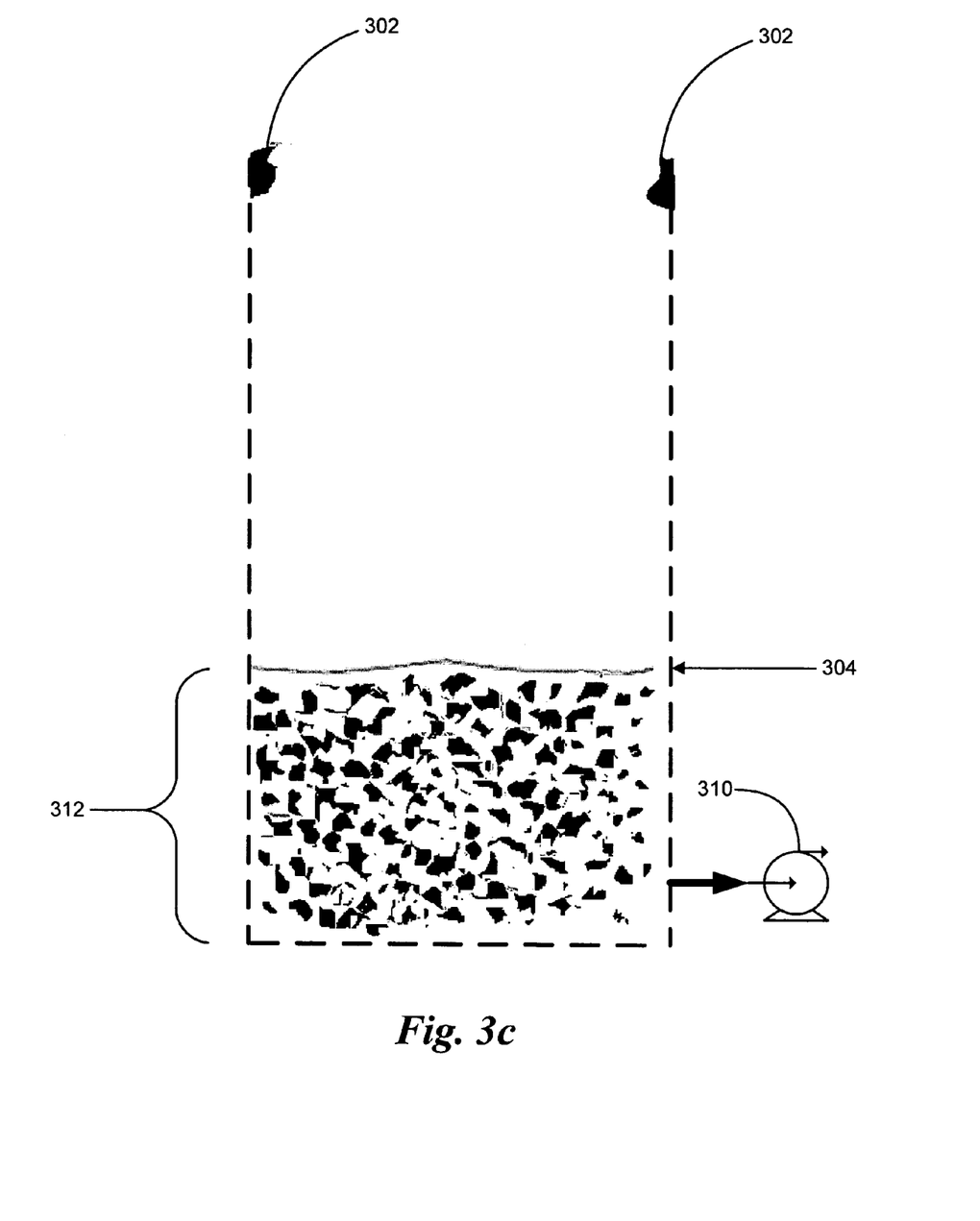

Turning to FIGS. 3a-3c, illustrated is cleansing action provided by the present invention. FIG. 3a depicts a lift station 112 containing large accumulations of immiscible materials 302 at or just below the high liquid mark 304. With the lift station filled with waste liquid up to or near high liquid mark 304, FIG. 3a depicts a point in time in which the pulsing of gas by the present invention has just begun. To avoid cavitation of lift station pumps, the invention is configured so that gas pulses are provided at times when lift station pumps are not operating. In operation of the invention, large bubbles 114 generate strong mixing currents 306. It will be appreciated by those of skill in the art that the strength of the mixing currents 306 generated by the invention depends on the speed at which each mixing bubble 114 travels through the water and the size of each bubble 114.

The speed of the mixing bubble 114 depends on the density of the gas employed in the invention relative to the density of waste liquid, and the bubble's shape. The greater the difference between the densities of waste liquid and the gas, the faster the mixing bubbles 114 rise through waste liquid. The more aerodynamic the shape of the bubble 114 becomes the faster the bubble 114 rises through waste liquid. For example, in one embodiment, the bubble 114 forms an oblate spheroid—a sphere whose dimension in the vertical direction is less than the dimension in the horizontal direction. In other embodiments such as that depicted in FIGS. 3a-3c, the bubble 114 forms a squished sphere having the trailing surface—the surface of the bubble 114 that is the rear of the bubble 114 relative to the direction in which bubble 114 moves—that is convex when viewed from the direction that the bubble 114 moves.

The size of the mixing bubble 114 depends on the flow rate of the gas into the liquid in lift station tank 112. Turning back to FIG. 2, the flow rate depends on the size of orifice 206 and the gas's injection pressure. Typical orifices 206 may vary from about ½ inch for smaller lift stations and shorter heads of waste liquid to 1½ inches for very large lift stations with tall heads of waste liquids. As stated above, injection pressures may vary, with typical operation requiring about 100 to about 125 or more pounds per square inch for larger lift stations and taller heads of waste liquid. As one increases the gas injection pressure, one increases the amount of gas injected into the liquid under plate 202 over a specific period of time that the valve 110 is open. And, as one increases the area of the orifice 206, one increases the amount of gas injected under plate 202 over a given period of time that the valve 110 is open. The size of bubble 114 can be varied by varying the volume of gas injected into lift station 112 and the period of time taken to inject a given quantity or pulse of gas. Under electronic control (not depicted), valve 110 is opened for a short period of time to release a pulse of gas under plate 202. Depending upon the embodiment, this pulse may last from 0.3 to 0.6 seconds. In one embodiment in which a relatively small pulse of gas is injected over a moderately long period of time, the size of bubbles 114 is approximately 0.5 meters across the largest dimension. In other embodiments in which a large quantity of highly pressurized gas is injected quickly through a larger orifice, the bubbles 114 are approximately 0.3 meters or greater across up a meter or more in largest dimension at the top of the lift station.

Turning now to FIG. 3b, illustrated is the tank of FIG. 3a after the invention has been operated as described above for a period of time. By force of the currents 306 generated by bubbles 114 over time, portions of accumulated immiscibles 302, including light plastic immiscibles that are not readily susceptible to remediation by biological augmentation, have been broken up into pieces 308 which are suspended in the waste liquid circulating in lift station tank 112. With continuing operation of the invention, additional bubbles 114 pass up through the waste liquid and currents 306 continue to break down immiscibles 302, also breaking circulating immiscibles 308 that have already broken off from accumulation 302 into smaller pieces. As a result of continued operation of the invention, immiscibles 302 are broken from the tank walls and equipment, resulting in a slurry of waste liquid and relatively small immiscible particles 308.

FIG. 3c illustrates tank 112 after further operation of the invention, in which waste liquid downstream pump 310 is operating to pump the tank contents to the downstream waste liquid treatment operations. As the waste liquid level 304 drops, the slurry 312 of waste liquid and small immiscible particles is removed from tank 112, thereby leaving a substantially reduced amount of accumulated immiscible residue 302 within the tank.

Operation of the present invention may be further enhanced by its use in conjunction with biological augmentation, such as provided by the MicroClear 207 bacterial formulation manufactured by Environmental Leverage, Inc. of North Aurora, Ill. Accumulations of immiscible residue within the tank can be softened by partial digestion provided by the grease-metabolizing microorganisms employed in biological augmentation, thereby rendering such accumulations more susceptible to the physical degradation into slurry particles by the currents generated from the large mixing bubbles generated by the present invention described in reference to FIGS. 3a-3c above. As is well-known to those of skill in the art, effective biological augmentation of immiscible residue remediation generally requires the addition of growth-enhancing nutrients to the liquid waste.

Embodiments of the present invention further facilitate biological augmentation by providing aeration to the waste liquid, thereby enhancing the growth of the grease-metabolizing microorganisms. It will be recognized by those of skill in the art that the surface area to volume ratio of the large mixing bubbles 114 provided by the present invention is such that these large bubbles do not provide a substantial amount of oxygen to the liquid waste. To provide aeration to enhance biological augmentation of immiscible residue remediation, embodiments of the present invention also include diffusers to provide small oxygenating bubbles to the waste liquid. Mixing by the large bubble masses provided by the present invention, and the addition of oxygen provided by the diffusers makes biological augmentation additives more effective, thereby reducing the amount of additive required to reduce the same volume of grease, and thus saving money and improving performance over time.

Figure 4:
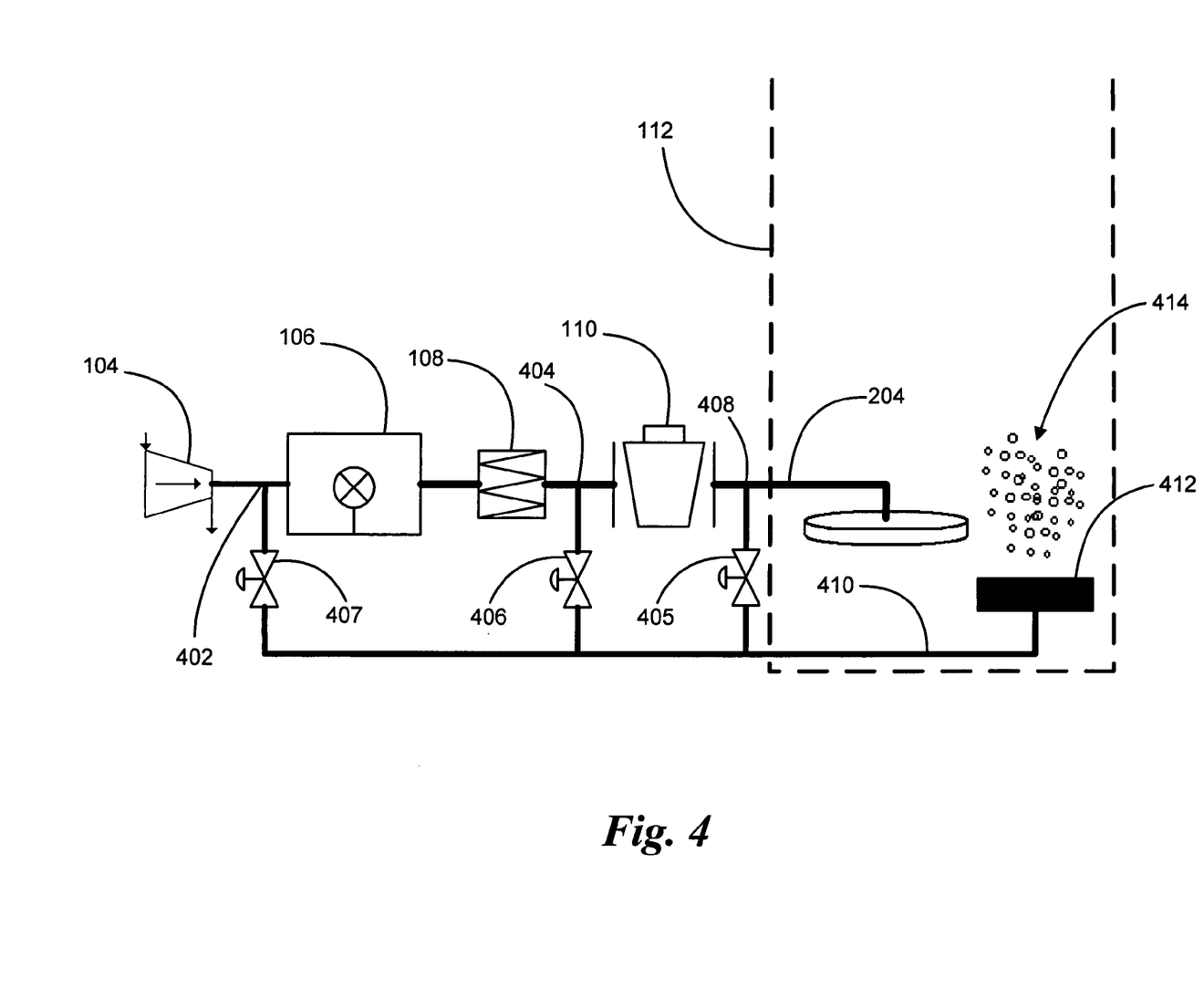
FIG. 4 is a diagrammatic depiction of an embodiment of the present invention providing both large mixing bubbles and fine aeration bubbles to a lift station.

Turning to FIG. 4, depicted is a diagram of the present invention wherein diffusers 412 supply fine aeration bubbles 414 to the waste liquid in lift station tank 112. As is well known to those of skill in the art, because smaller bubbles have a greater surface area to volume ratio, smaller bubbles of oxygen-containing gas are more effective than large bubbles in providing oxygen for solvation in the liquid. Generally, bubbles 414 provided by diffusers 412 are less than 50 millimeters in diameter and are more typically on the order of 5 to 20 millimeters in diameter for effective oxygenation. In the depicted embodiment, pressurized oxygen-containing gas is provided to diffuser 412 from the same source 104 as pressurized gas for formation of the large mixing bubbles 114 (FIGS. 1, 3a-3c) of the present invention. Diffuser 412 receives gas from diffuser supply line 410. By opening pulsed gas valve 405, diffuser supply line 410 may be provided with pulsed gas from tap 408 in mixing bubble supply line 204, or alternatively, by opening filter valve 406, the diffuser may receive a continuous filtered supply of gas from tap 404 in the supply line between gas filter 108 and pulse valve 110. If it is desirable to provide diffuser 412 with a continuous supply of high-pressure unfiltered and unregulated gas, compressor valve 407 is opened to provide pressurized gas from tap 402 between compressor 104 and regulator 106. Operation of the diffuser to provide oxygenating small bubbles facilitates growth of biological augmentation organisms by increasing the dissolved oxygen in the waste liquid. In turn, the active biological augmentation organisms serve to loosen and liquefy portions of the accumulated immiscibles in the lift station tank, thereby increasing the effectiveness of the large mixing bubbles of the present invention to remediate such accumulations.

Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above. While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

We claim:

1. A process for remediating adhering immiscible materials in a lift station tank, comprising:
   allowing the tank to fill with liquid;
   generating, within the liquid, large mixing bubbles of six inches or greater in diameter;
   continuing generation of large mixing bubbles until a desired amount of immiscible materials have broken loose to form a slurry in the tank; and
   pumping the resultant slurry from the tank.

2. A process according to claim 1, wherein the large mixing bubbles are generated by bubble forming plates located substantially at the bottom of the tank.

3. A process for reducing adhering immiscible materials in a lift station tank which fills and empties with liquid, the process comprising:

periodically generating, within the liquid, large mixing bubbles of six inches or greater in diameter, at least some of which are generated when the tank is filled with liquid.

4. A process according to claim 3, further comprising adding grease-metabolizing aerobic microorganisms to the tank liquid; and increasing the dissolved oxygen in the tank liquid by generating, within the liquid, small aeration bubbles of two inches or smaller in diameter.

5. A process for remediating adhering immiscible materials in a lift station tank, comprising:

providing biological augmentation until portions of the immiscible materials are loosened and liquefied; then allowing the tank to fill with liquid;

generating, within the liquid, large mixing bubbles of six inches or greater in diameter;

continuing generation of large mixing bubbles until a desired amount of immiscible materials have broken loose to form a slurry in the tank; and pumping the resultant slurry from the tank.

6. A process according to claim 5, wherein biological augmentation comprises:

adding grease-metabolizing aerobic microorganisms to the tank liquid; and increasing the dissolved oxygen in the tank liquid by generating, within the liquid, small aeration bubbles of two inches or smaller in diameter.

* * * * *